United States Patent
Chen

(10) Patent No.: US 6,581,492 B1
(45) Date of Patent: Jun. 24, 2003

(54) HANDLE FOLDING STRUCTURE FOR A FOLDABLE BICYCLE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/056,013

(22) Filed: Jan. 28, 2002

(51) Int. Cl.[7] ............................ B62K 21/16; F16B 7/10; B62M 1/00
(52) U.S. Cl. ................... 74/551.3; 74/551.1; 74/551.4; 280/278; 280/287; 280/87.041; 16/900; 403/109.7
(58) Field of Search ........................... 74/551.1–551.8; 280/287, 278, 87.041, 87.042, 87.05; 16/324, 321, 900; 292/113; 403/109.7, 110

(56) References Cited

U.S. PATENT DOCUMENTS

| | | | | |
|---|---|---|---|---|
| 5,492,350 A | * | 2/1996 | Pan | 280/278 |
| 6,305,869 B1 | * | 10/2001 | Chen | 403/109.5 |
| 6,318,741 B1 | * | 11/2001 | Chen | 280/87.041 |
| 2002/0121155 A1 | * | 9/2002 | Wu | 74/551.7 |
| 2002/0139217 A1 | * | 10/2002 | Montague et al. | 74/493 |
| 2002/0167142 A1 | * | 11/2002 | Chen | 280/87.041 |
| 2003/0035682 A1 | * | 2/2003 | Chen | 403/109.7 |

FOREIGN PATENT DOCUMENTS

| | | | | |
|---|---|---|---|---|
| GB | 2360260 A | * | 9/2001 | 280/87.041 |
| GB | 2363103 A | * | 12/2001 | 280/87.041 |
| GB | 2364739 A | * | 2/2002 | 280/87.041 |
| GB | 2373769 A | * | 10/2002 | 280/87.041 |
| JP | 8-91272 | * | 4/1996 | 74/551.3 |
| JP | 8-282569 | * | 10/1996 | 74/551.3 |

* cited by examiner

Primary Examiner—Vinh T. Luong
(74) Attorney, Agent, or Firm—Rosenberg, Klein & Lee

(57) ABSTRACT

A handle folding structure of a foldable bicycle comprises a joint connected to a head tube below a handle; a clamp inserted to a fork pivoting tube pivoted through a stem; a positioning bit with a conic stop to extend into the fork pivoting tube; the upper section including an upper and a lower sections pivoted to each other; one longitudinal chute being provided on one side of the upper and the lower sections of the joint to allow the conic stop extending into the fork pivoting tube to hold against the chutes; a circumferential groove at the lower end of the chute so to pull out with the joint at the lower end of the head tube for the conic stop to hold against the lower end of the chute; and the joint, the handle and a front wheel being able to execute free rotation to minimize the size of the bicycle when folded up for storage.

1 Claim, 13 Drawing Sheets

HANDLE FOLDING STRUCTURE FOR A FOLDABLE BICYCLE

BACKGROUND OF THE INVENTION (a) Field of the Invention

The present invention relates to a folding structure of a handle for a foldable bicycle, and more particularly to one that provides a structure of bendable junction that connects the head tube below the handle and the tube pivoting to the head tube can be pulled out for the front wheel to turn in any direction relatively to the fork and the front wheel as desired, so that once the handle is turned and folded without causing the front wheel to be restricted to a fixed direction while allowing the front wheel to turn in any direction, thus to minimize the volume of the bicycle when folded.

(b) Description of the Prior Art

For bulk products, they are usually made foldable and/or retractable to minimize the space for storage, as commonly observed with a foldable bicycle, a scooter with handle, or a tricycle for children. Basically, such vehicle operated by manual is engineered with externally and internally retractable structures adapted to a longer and higher frame so to reduce the size when stored. In addition, to achieve fast and simple operation, the use of fastening parts of a quick-release wrench is widely used for the design to fix the retractable structure. Generally, a pipe strap provided with a quick-release wrench fastening the end of the external tube is designed for the retractable tube, so to fasten the end with C-shaped section of the external tube, thus to further fasten the inner tube that inserted into the external tube. A positioning means may be also provided to the pipe strap or the external tube so that the inner tube may longitudinally slide and retract in relation to the external tube without turning. Furthermore, once the retracted length still fails to reduce the size, a foldable structure is provided. In the prior art of a foldable bicycle, or a scooter with handle, a pivoting joint is connected to where between the lower end of the stem connected to the handle and the upper end of the fork pivoted through the head tube of the frame. Accordingly, the handle and the head tube connected to the pivoting joint are folded at a certain inclination to rest on either side or directly folded backward to rest over the frame. Furthermore, a great deal of R&D efforts has been also inputted into improvement of foldable bicycles (and scooter with handle). Within one of those improvements, a special insertion type of pivoting joint incorporated with a clamp of quick-release wrench is provided to the head frame as illustrated in FIG. 10. A clamp (A) composed of the quick-release wrench (A1), a pin shaft (A2), a nut (A3) and a fixation bolt (A4) incorporated with a positioning bit (B) is mounted to a structure connecting the head tube of the frame to the fork. Wherein, the positioning bit (B) has a hole (B1) bored at the center of a single flat sheet member and a small section of conic stop (B2) is formed beneath the sheet member. The combination of the positioning bit (B) and the clamp (A) is done by having placed the positioning bit (B) into an open end of the ring where the clamp (A) penetrates the ring of the quick-release wrench (A1) with the conic stop (B2) of the positioning bit (B) facing the interior of the ring of the clamp (A); the pin shaft (A2) to penetrate the open end of the ring of the clamp (A) and the hole (B1) in the positioning bit (B); and the nut (A3) to be locked to the other end of the shaft pin (A2) for both of the clamp (A) and the positioning bit (B) to connect to each other. In the structure to connect the head tube to the fork, a groove (C1) is axially provided to the upper end of the pivoting tube, a fixation hole (C2) is bored through the end of the pivoting tube, and a joint (E) is provided in relation to where the head tube (D) is inserted into the fork pivoting tube (C). The joint (E) is composed of an upper section (E1) pivoted to a lower section (E2). Both of the upper section (E1) and the lower section (E2) are each respectively inserted into a pivot (E21) and then pivoted with a rivet (E3). Two V-shaped, longitudinal chutes (E12, E22) are punched respectively on one side of the upper section (E1) and the lower section (E2) in the direction relatively to the groove (C1) of the fork pivoting tube (C). A circular chamber (E23) containing a tenon (E4) is provided inside the upper section (E1) or the lower section (E2) of the joint (E) (the lower section (E2) as illustrated). As illustrated in FIG. 11, the tenon (E4) is contained in a case (E43) having a coil (E41) to hold against a steel ball (E42). A channel (E13) is provided on a tongue (E11) protruding from the upper section (E1) in relation to the steel ball (E42) of the tenon (E4). When assembled as illustrated in FIG. 11, the clamp (A) is inserted to the upper end of the fork pivoting tube (C) and the fixation bolt (A4) is secured in the fixation hole (C2) at the end of the fork pivoting tube (C). The conic stop (B2) to the lower part of the positioning bit (B) connecting through the pin shaft (A2) pivoted to the quick-release wrench (A1) extends into the groove (C1) and held in position in the fork pivoting tube (C). Wherein, the conic stop (B2) extends to hold against the chutes (E12, E22) respectively of the upper and lower sections (E1, E2) of the joint (E) connected to the head tube (D) inside the fork pivoting tube (C) so to prevent the fork pivoting tube (C) from turning and to execute only vertical retraction. Furthermore, when both of the upper and the lower sections (E1, E2) are erected to be held in position in the channel (E13) by means of the steel ball (E42) of the tenon (E4), and the portion for insertion provided with the joint (E) below the head tube (D) is inserted into and held position in the fork pivoting tube (C), both of the upper and lower sections (E1, E2) of the joint (E) are pushed into relatively to the fork pivoting tube (C) until the upper edge of the conic stop (B2) to the lower part of the positioning bit (B) holds against and is secured in position by the upper end of the chute (E12) on the upper section (E1) of the joint (E). Then the quick-release wrench (A1) is pressed for the clamp (A) to press against the fork pivoting tube (C) and tightly fastened in relation to the integral circular portion above the chute (E12) on the upper section (E1) of the joint (E).

To fold up the handle at the head of the frame by means of the lower part of the head tube (D) for storage, the quick-release wrench (A1) is released to free the clamp (A) from fastening the fork pivoting tube (C), thus to release the upper section (E1) of the joint (E) from the head tube (D). As illustrated in FIG. 12, the head tube (D) is pulled up to ascend the joint (E) from the lower end of the head tube (D) for the upper section (E) to expose out of the upper end of the fork pivoting tube (C). Once the joint (E) is pulled up to its extreme, the positioning bit (B) incorporated to the clamp (A) restricts the joint (E) without being disengaged with its conic stop (B2) to hold against the end of the chute (E22) on the lower section (E2) of the joint (E). As illustrated in FIG. 13, a front wheel must be rotated facing either side for a proper angle jointly by the handle and the head tube (D) through the connection of the joint (E) and the fork pivoting tube (C) to change the folding direction. Accordingly, the laterally extended T-shaped handle is turned for approximately 90 degrees. Finally, the substantial part of the frame including the head tube (D), the handle is pivoted and folded downward by the upper section (E1) of the joint (E) in relation to the lower section (E2) of the joint (E) for the handle to rest on one side in front of the frame.

While being folded for storage as described above, the handle must be turned towards the front wheel is mainly due to the rotation direction of the joint (E) provided at the lower end of the head tube (D) is subject to the positioning bit (B) incorporated to the clamp (A) provided on the upper part of the fork pivoting tube (C) so to facilitate restoring to face direct front when stretched up for use of the bicycle without further adjustment required. Said design is provided with a certain convenience. However, the T-shaped handle must be turned for approximately 90 degrees to reduce the size defined by the width of the handle. Therefore, it is no way to avoid turning the front wheel. Said folding structure of course is an ideal folding structure should we neglect the space increase resulted from the front wheel turning sideways. Nonetheless, when the essence of the improvement is to minimize the storage space, the con figuration of having the head tube (D) with its joint (E), the fork pivoting tube (C) and the front wheel altogether to protrude sideways deserves a further improvement. The portable bicycle ideal for shorter-range transportation means so popular among the 9-to-5 in Japan relates to a foldable bicycle that absolutely demands the minimized size up to micrometers. The foldable bicycle requires the smaller size and the least space for storage certainly gives more market potential.

SUMMARY OF THE INVENTION

The primary purpose of the present invention is to provide a folding structure for a handle of a foldable bicycle to minimize the volume of the bicycle when folded up for storage. To achieve the purpose, a folding structure at where the lower part of the head tube under the handle connects to the fork pivoting tube can be pulled out for turning to any direction for the handle to freely rotate in relation to the fork and the front wheel, and the turning of the handle for storage will not be linked to the front wheel while the front wheel is free to turn in any direction characterized by that:

A joint is connected to the lower end of the head tube of the lower section of the handle and a clamp is inserted to the upper part of the fork pivoting tube that is pivoted through the head tube. A positioning bit is provided with a conic stop inside the positioning bit to extend into the fork pivoting tube. Said joint having its upper section pivoted to its lower section penetrates into the fork pivoting tube. A longitudinal chute is each provided respectively on the side of the upper and the lower section of the joint to receive the conic stop penetrating into the fork pivoting tube from the positioning bit. In relation to the longitudinal chute at the lower section of the joint, a circumferential groove having the same depth of the chute is formed below the chute. Using the circumferential groove, the head tube is pulled out to its extreme in relation to the fork pivoting tube for the conic stop from the positioning bit to hold against the longitudinal chute of the lower section of the joint to reach down the terminal.

Consequently, the joint is free to rotate by having the circumferential groove at the terminal of the chute on the lower section of the joint to correspond to the conic stop of the positioning bit.

DETAILED DESCRIPTION OF THE PREFERRED EMBODIMENTS

Figure 1:
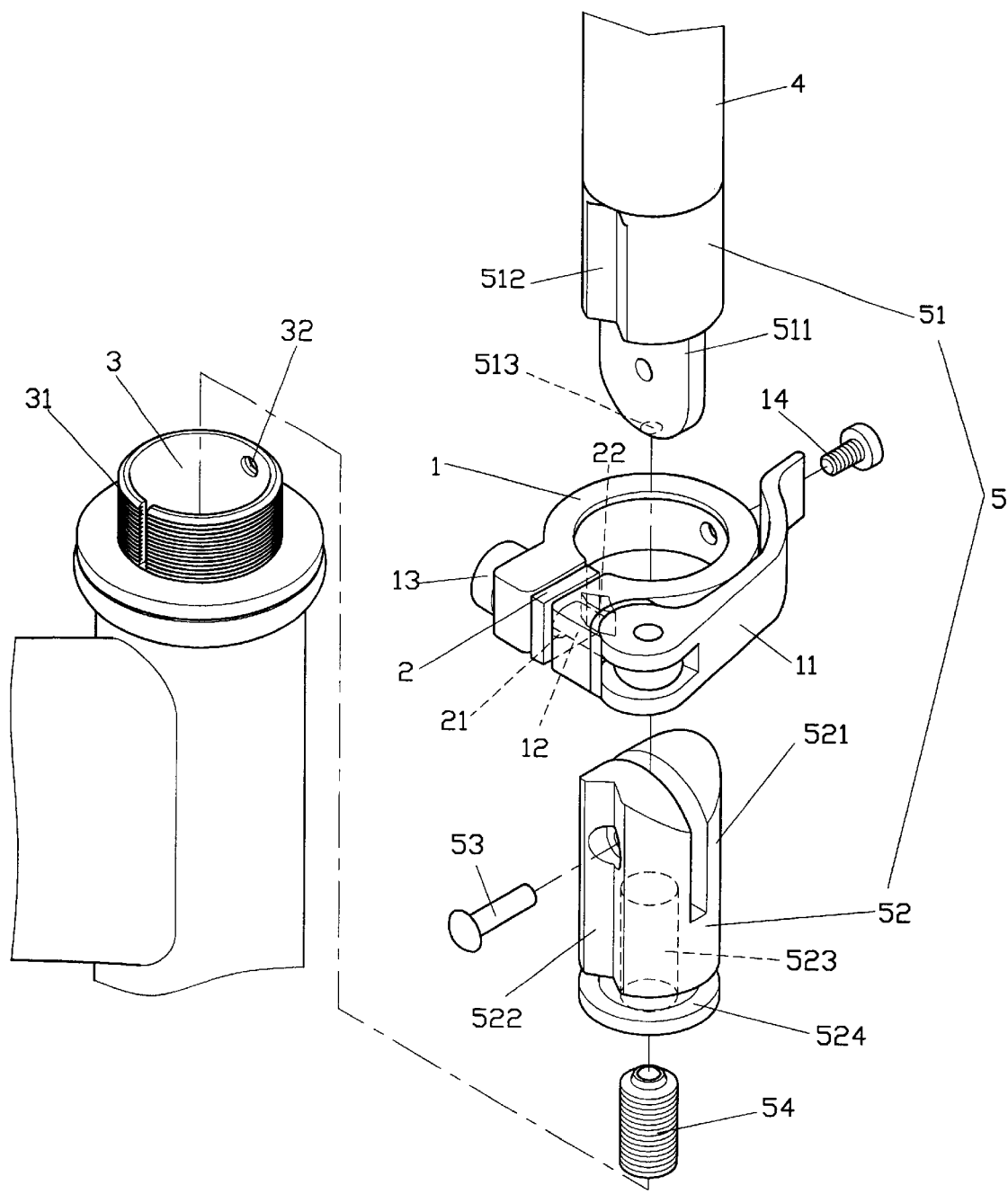
FIG. 1 is a perspective view showing the present invention.
Figure 2:
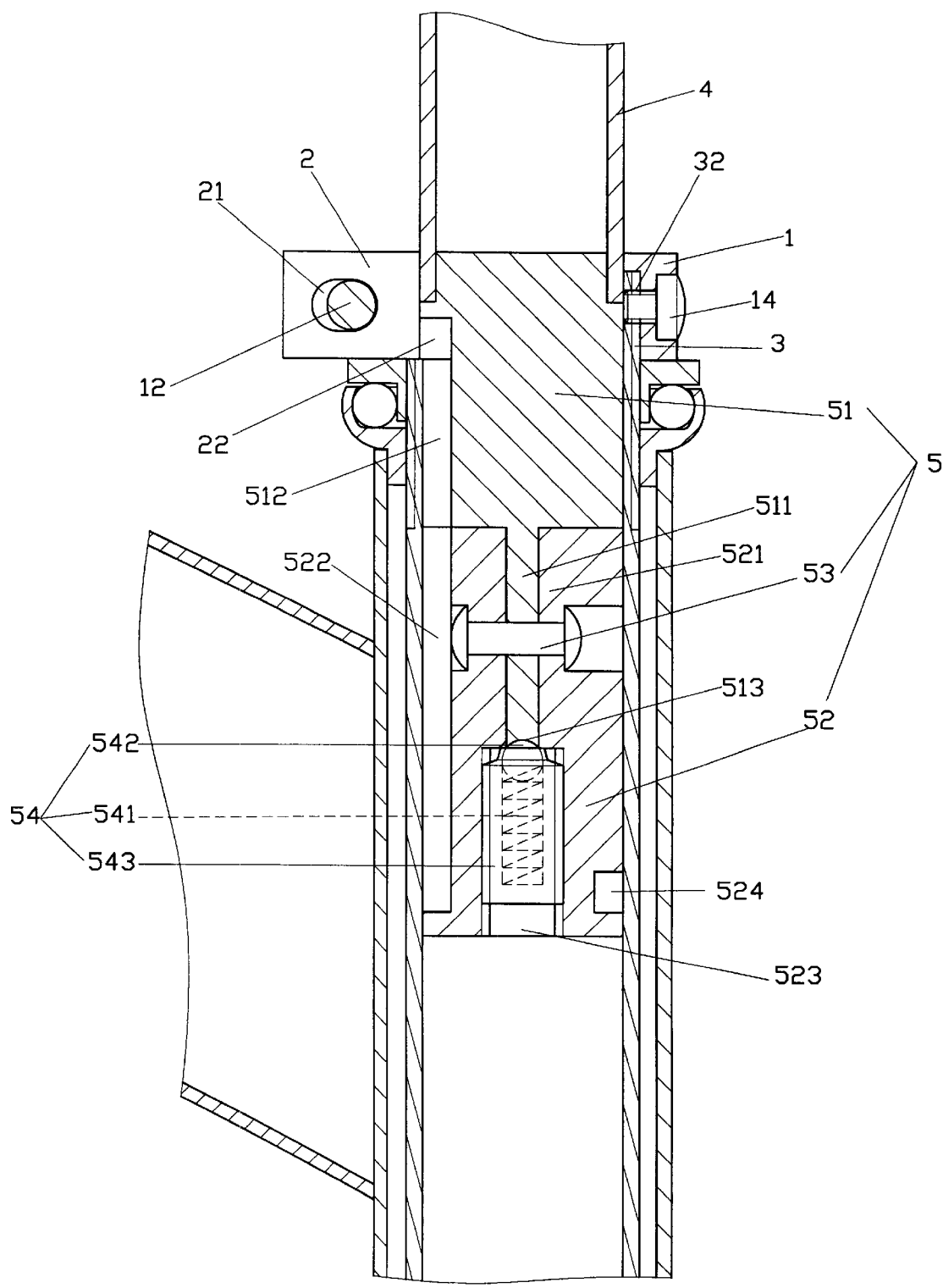
FIG. 2 is a sectional view of an assembly of the present invention.

Referring to FIG. 1, the present invention applied to a folding structure for the connection between the lower section of a head tube (4) below a handle and a fork pivoting tube (3) pivoted through a stem of a bicycle relates to an improvement of a prior art of the same inventor. A clamp (1) comprising a quick-release wrench (11), a pin shaft (12), a nut (13), a fixation bolt (14) with a positioning bit (2) is inserted to the upper part of a fork pivoting tube (3). The positioning bit (2) is placed in the open end of the ring where the clamp (1) is inserted through the quick-release wrench (11) so that a conic stop (22) from the positioning bit (2) is facing the interior of the ring of the clamp (1). The conic stop (22) is secured to the other end of the pin shaft (12) by having the pin shaft (12) to penetrate the open end of the ring of the clamp (2) and a hole (21) in the positioning bit (2) in conjunction with the nut (13). Furthermore, a groove (31) is axially provided on the top end of the fork pivoting tube (3) and a fixation hole (32) bored in the end of the fork pivoting tube (3). A joint (5) is provided at the lower end of the head tube (4) from the lower part of the handle. The joint (5) is composed of an upper section (51) and a lower section (52) pivoted to each other. Both of the upper section (51) and the lower section (52) of the joint (5) are mutually inserted into a pivot (521) with a tongue (511) and pivoted together in conjunction with a rivet (53). At where relatively to the direction of the groove (31) on the fork pivoting tube (3), on both sides respectively of the upper section (51) and the lower section (52) of the joint (5) is separately provided with a longitudinal chute (512, 522). A circular chamber (523) containing a tenon (54) is provided in the relatively inner end inside the upper section (51) or the lower section (52) of the joint (5) (the lower section (52) as illustrated in FIG. 2). The tenon (54) is composed of a coil (541) pushing against a steel ball (542) in a container (543), as illustrated in FIG. 2. A channel (513) is provided on the tongue (511) of the upper section (51) of the joint (5) in relation to the steel ball (522) of the tenon (54). However, it is to be noted that such positioning structure by means of a spring-load stop is not necessarily required in the claims to be made by the present invention, and thus is not preconditioning to the practice of the present invention.

A circumferential groove (524) of the same depth is formed at the lower end of the longitudinal chute (522) on the lower section (52) of the joint (5).

Figure 3:
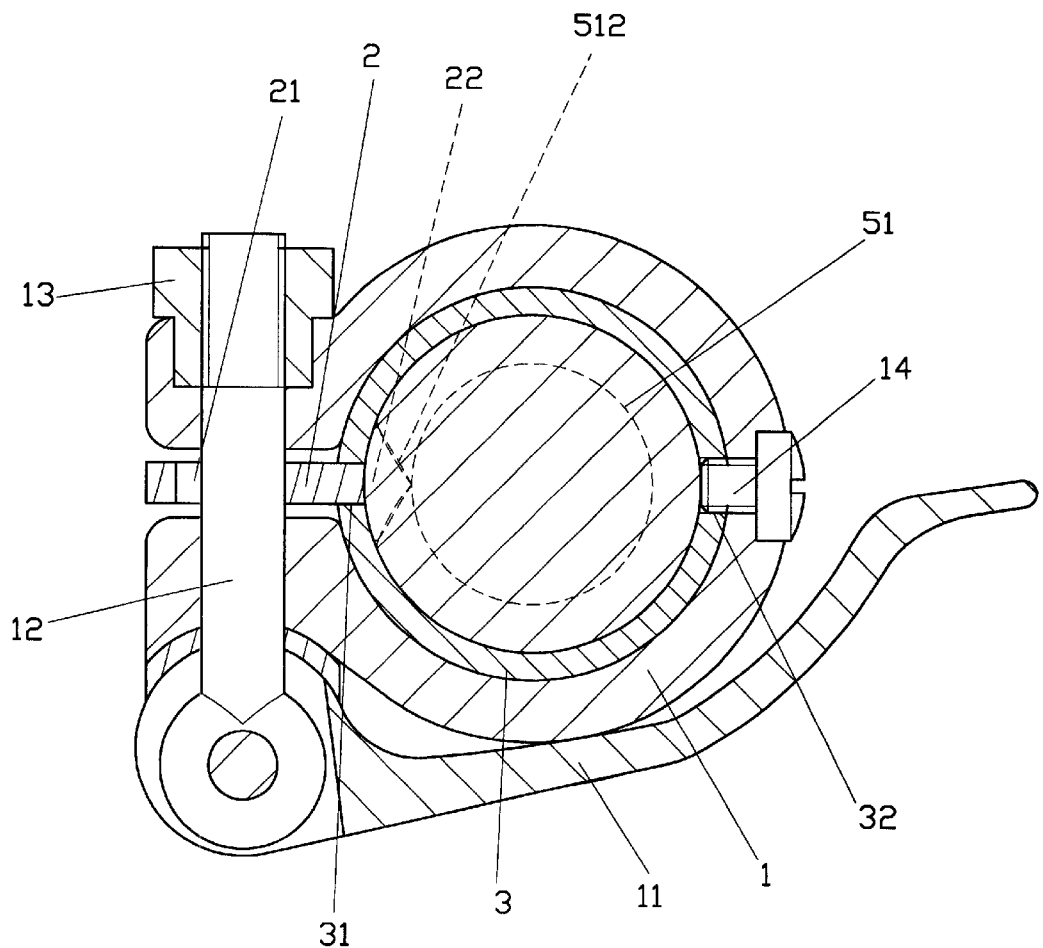
FIG. 3 is a top view of a section of the assembly of the present invention.

In practice as illustrated in FIGS. 2 and 3, the clamp (1) is inserted to the upper end of the fork pivoting tube (3) and secured by inserting the fixation bolt (14) into the fixation hole in the end of the fork pivoting tube (3). The conic stop (22) from the lower part of the positioning bit (2) is inserted by the pin shaft (12) pivoted to the quick-release wrench (11) extends into the groove (31) on the fork pivoting tube (3) and is placed therein. The conic stop (22) extends further to hold against the chutes (512, 522) on the upper and lower sections (51, 52) of the joint (5) connected to the head tube (4) so that with the presence of the fork pivoting tube (3), the head tube (4) is prevented from turning and is only permitted to execute vertical retraction. Once the head tube (4) is inserted into and held in position in the fork pivoting tube (3), both of the upper and the lower sections (51, 52) of the joint (5) are erected and held in position by having the steel ball (542) of the tenon (54) caulked in the channel (513), the both of the upper and lower sections (51, 52) of the joint (5) are pushed into relatively to the fork pivoting tube (3) until the upper edge of the conic stop (22) on the lower part of the positioning bit (2) holds against and is secured in position in the upper end of the chute (512) on the upper section (51) of the joint (5). The quick-release wrench (11) is pressed for the clamp (1) to tightly press the fork pivoting tube (3), the fork pivoting tube (3) is fastened and held in position in relation to the head tube (4) above the chute (512) on the upper section of the joint (5).

Figure 4:
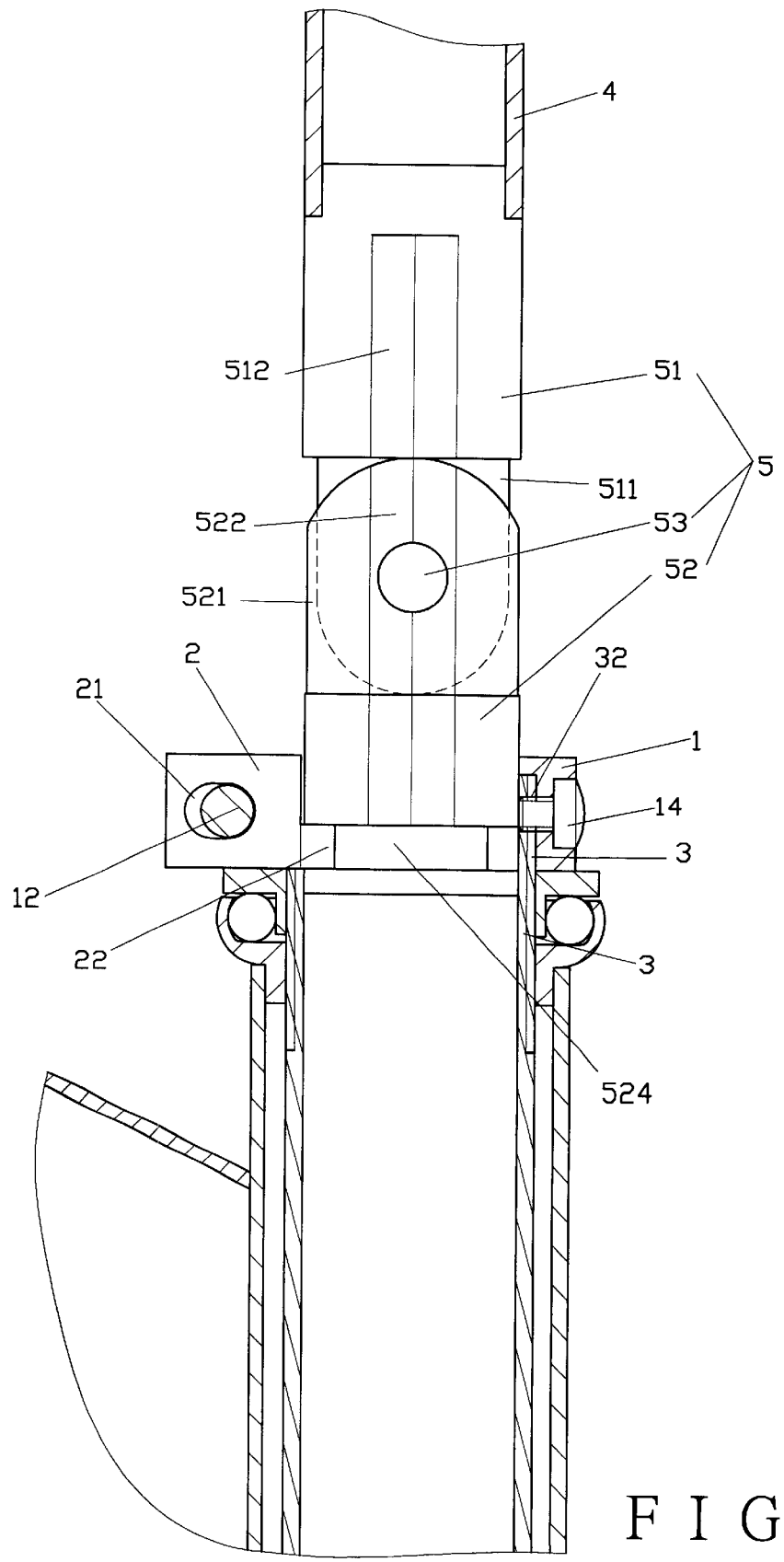
FIG. 4 is a side view of a section of the handle of the present invention that is pulled and turned.
Figure 5:
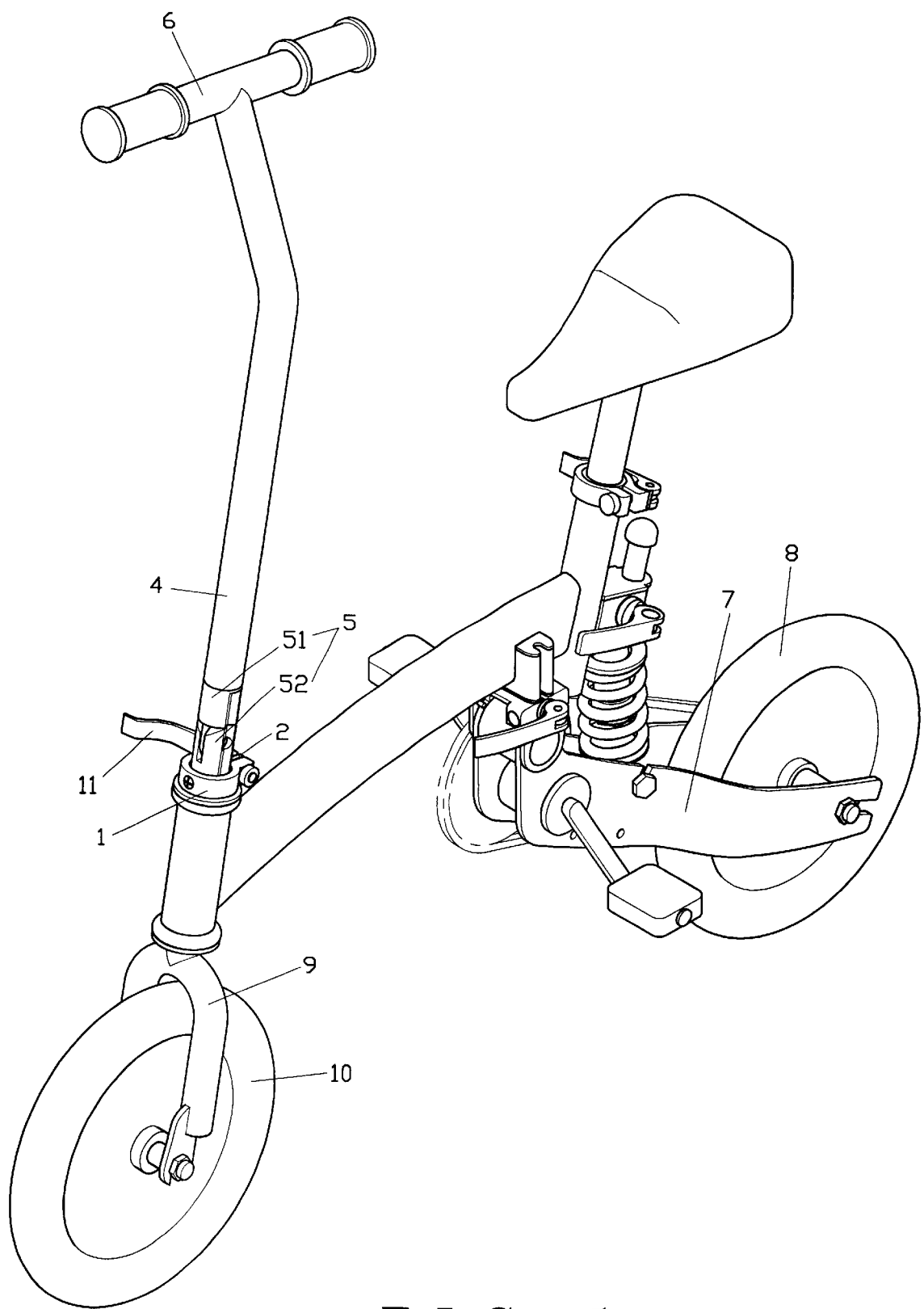
FIG. 5 is a perspective view of the section of the handle of the present invention that is pulled and turned.
Figure 6:
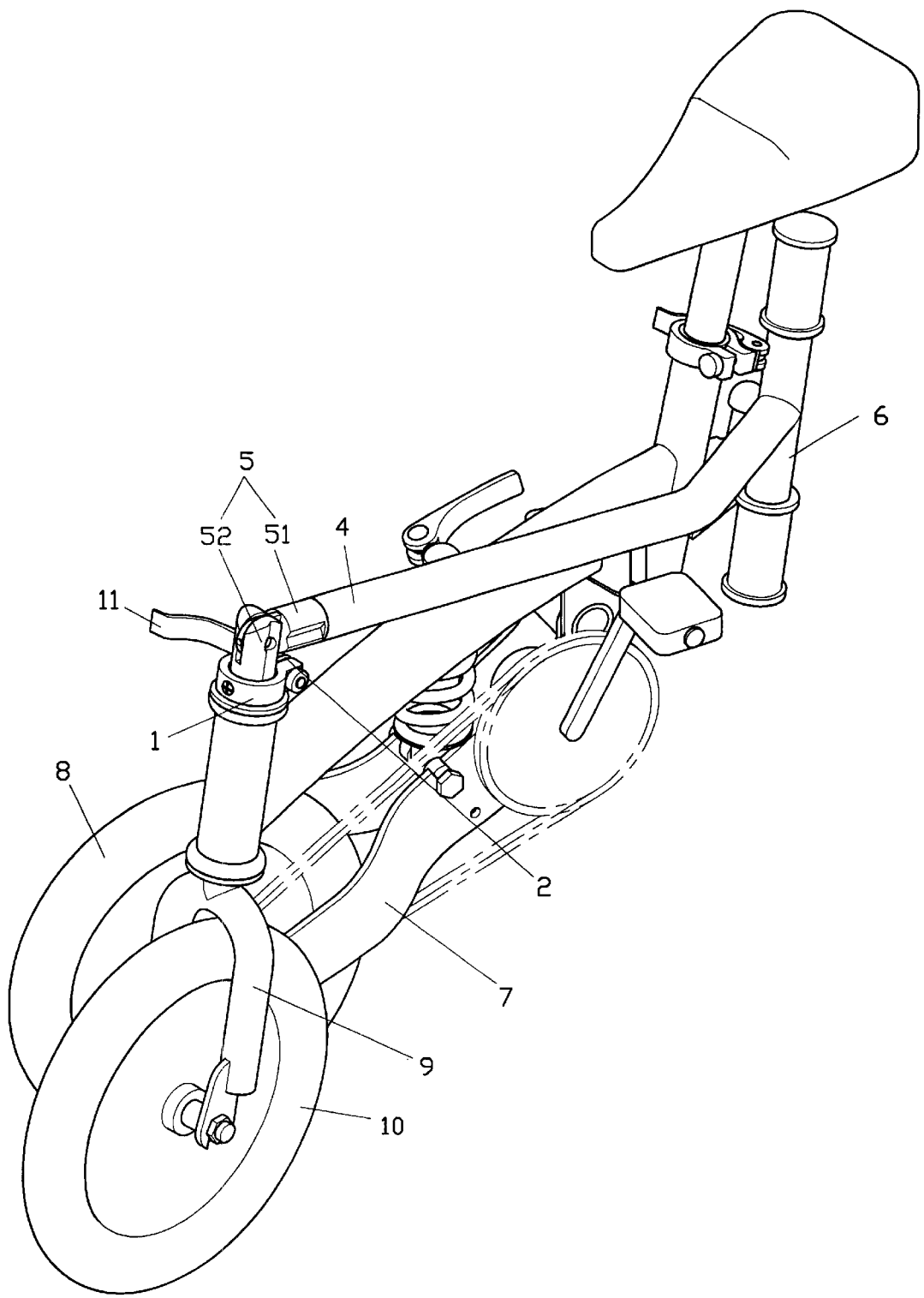
FIG. 6 is a perspective view of the folded handle of the present invention.
Figure 7:
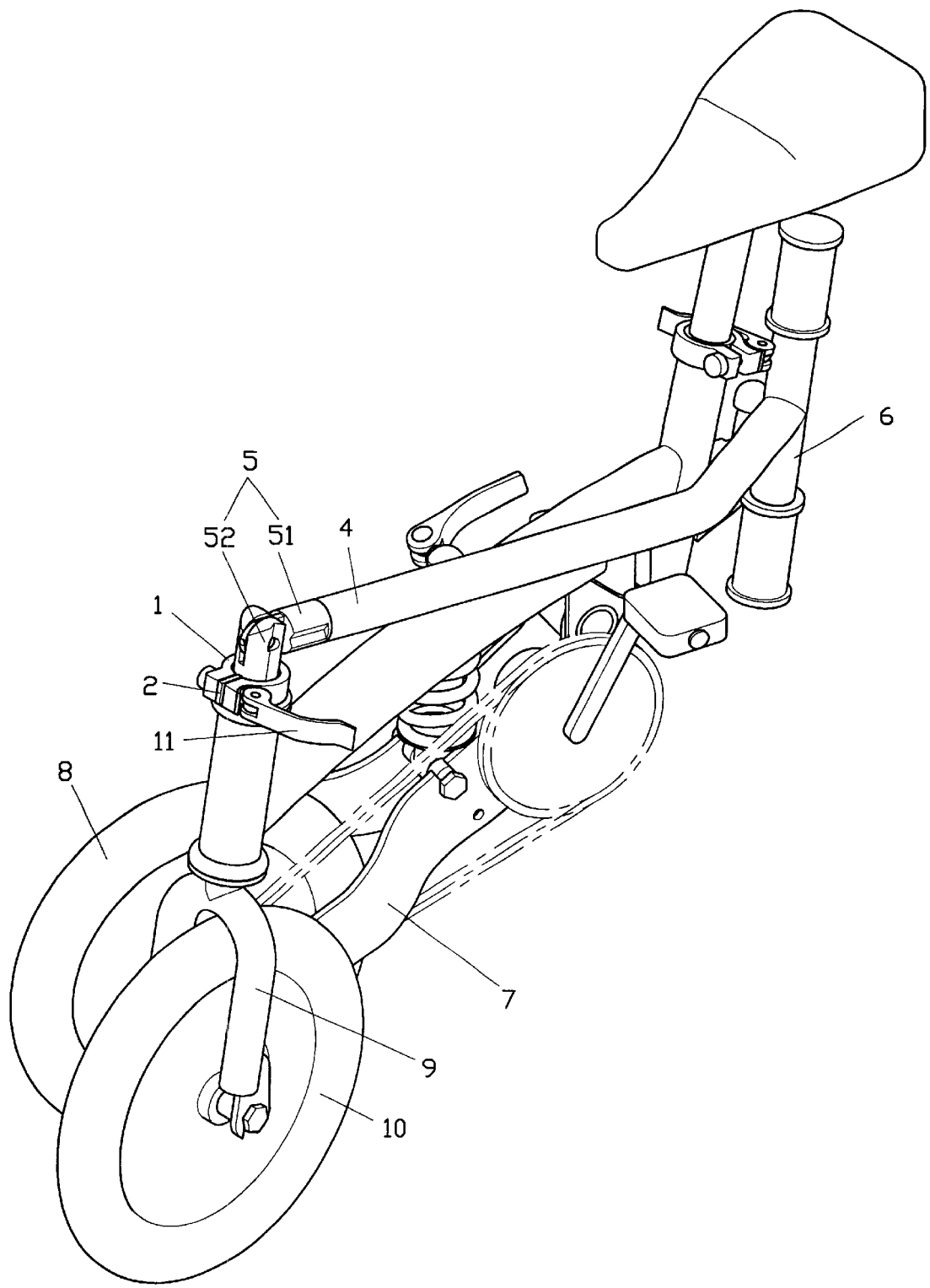
FIG. 7 is a perspective view showing the folded handle with the front wheel rotated.

Upon folding up the handle (6) as illustrated in FIG. 5 and the lower part 3 of the head tube (4), the quick-release wrench (11) fastening the fork pivoting tube (3) for the clamp (1) not to press against the fork pivoting tube (3) thus to release its clamping of the upper section (51) of the joint (5) on the head tube (4). As illustrated in FIG. 4, the head tube (4) is pulled out to pull up the joint (5) at the lower end for the upper section (51) of the joint (5) to expose out of the upper end of the fork pivoting tube (3) until the conic stop (22) extending in the groove (31) of the fork pivoting tube (3) from the positioning bit (2) incorporated to the clamp (1) is holding against the end of the channel (522) on the lower section (52) of the joint (5). Consequently, the joint (5) will not be fully disengaged. Also referring to FIGS. 4 and 5, given with the conic stop (22) of the positioning bit (2) is holding against the lower end below the chute (522) on the lower section (52) of the joint (5), the conic stop (22) is also at a position corresponding to the circumferential groove (524) at the end of the chute (522) on the lower section (52), thus to cause the joint (5) to move for free rotation following the conic stop (22) of the positioning bit (2) by taking advantage of the circumferential groove (524) at the end of the chute (522) on the lower section (52). Accordingly, both of the handle (6) and the head tube (4) are able to execute free rotation by the exposed joint (5) with its lower section (52) in relation to the fork pivoting tube (3). When both of the handle (6) and the head tube (4) rotate sideways for a proper angle to merely change the folding direction and to shift the T-shaped laterally extending handle (6) for approximately 90 degrees; thus to facilitate folding the structure of the handle including the head tube (4) and the handle (6) downward by pivoting the upper section (51) of the joint (5) in relation to the lower section (52) of the joint (5) to rest on one side of the front frame as illustrated in FIG. 6. When the present invention is applied to a foldable frame, a seat stay (7) and a rear wheel (8) of the rear frame are folded to face another side of the front frame thus to reduce the storage size half of that when stretched out. Furthermore, a fork (9) is pivoted to a front wheel (10), a certain distance is maintained between where the fork (9) is pivoted in relation to the axis of the front wheel (10). Therefore, as illustrated in FIG. 6 when the front wheel (10) is facing ahead, the body of the wheel is extending forward while relatively when it is folded, a protrusion relatively to the rear wheel (8) in front on the other side to make the entire length of the bicycle when folded to be longer to increase the consumption of packing material and a larger space required for storage. To this aspect, in the present invention, the handle (6) is designed to freely rotate together with the head tube (4). Furthermore, both of the fork (9) and the front wheel (10) are also designed to rotate as desired. As illustrated in FIG. 7, the fork (9) rotates for 180 degrees to cause the front part of the front wheel (10) facing backward, thus to reduce the protrusion in relation to the rear wheel (9) to further reduce the size of the frame for storage.

Figure 8:
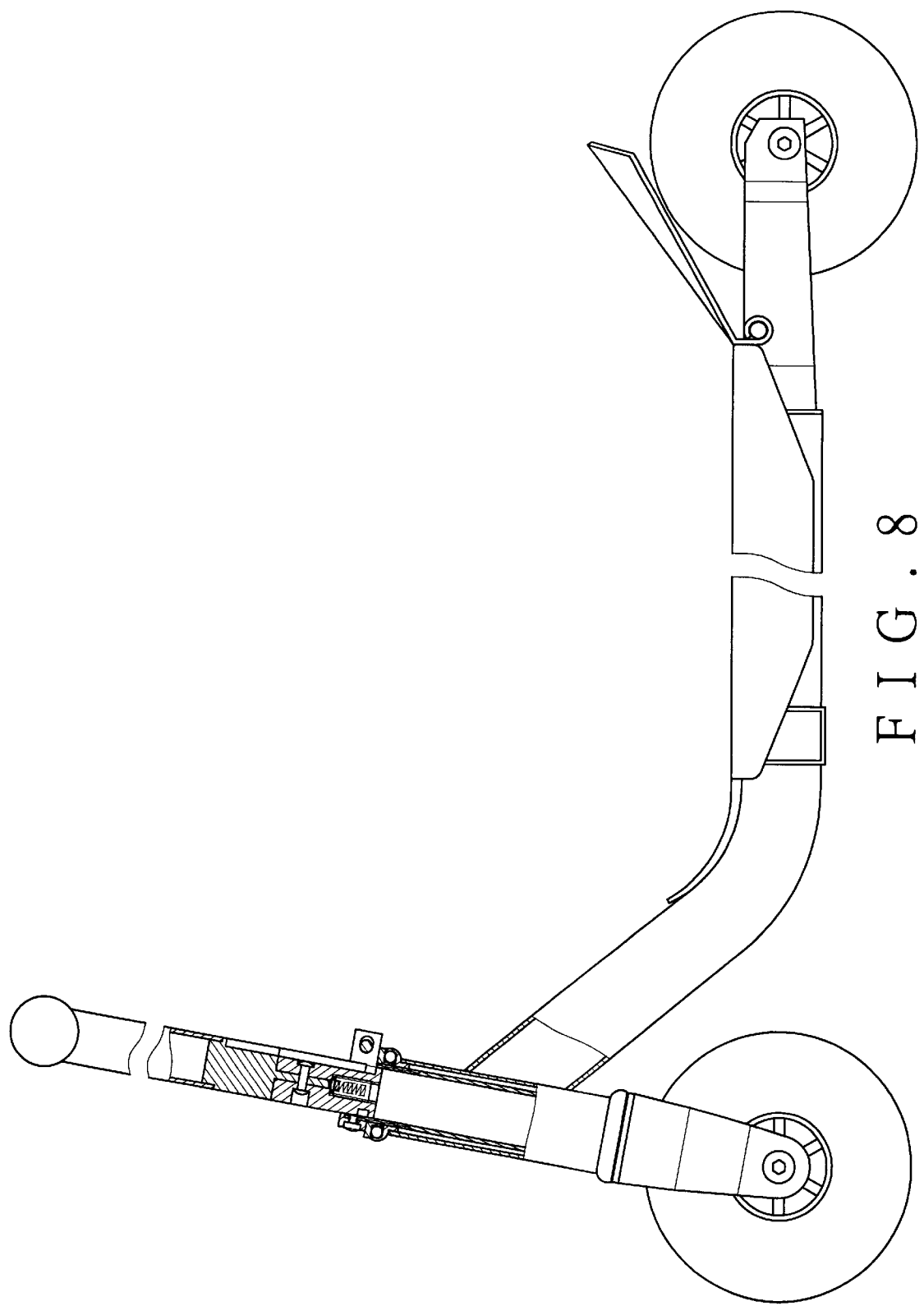
FIG. 8 is a sectional view showing that the present invention is adapted to a scooter with handle.
Figure 9:
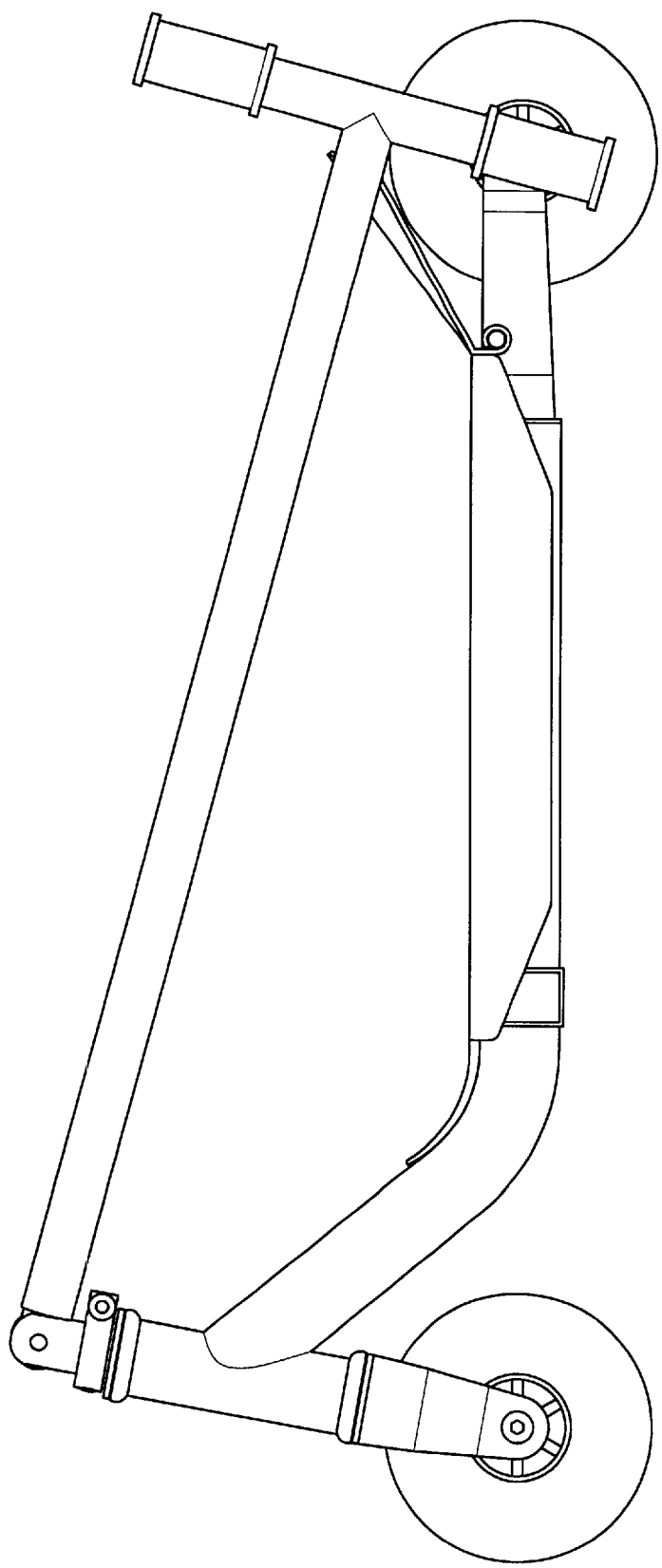
FIG. 9 is a schematic view showing that the present invention adapted to the scooter with handle is folded.
Figure 10:
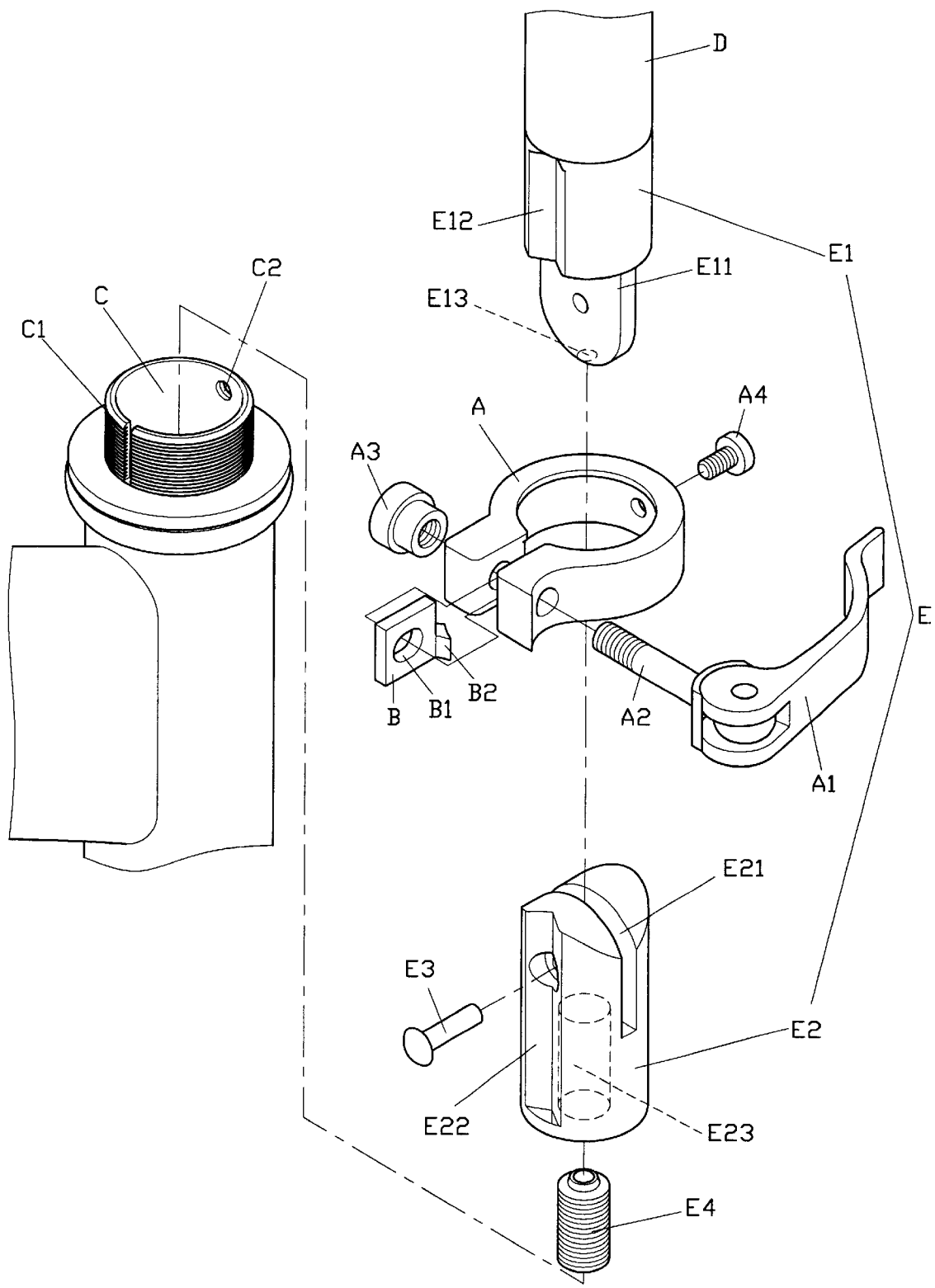
FIG. 10 is a perspective view of a prior art.
Figure 11:
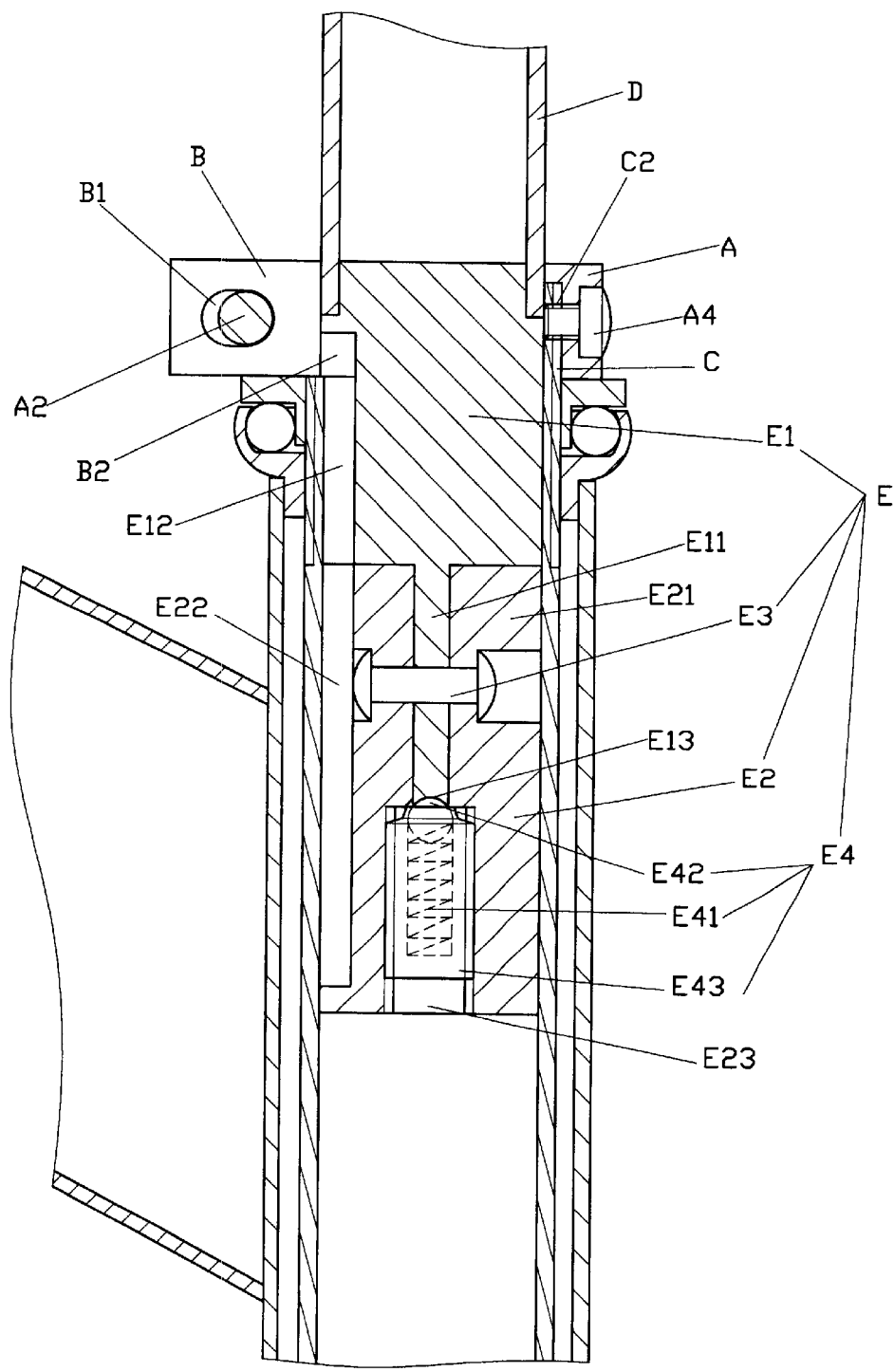
FIG. 11 is a side view showing a section of an assembly of the prior art.
Figure 12:
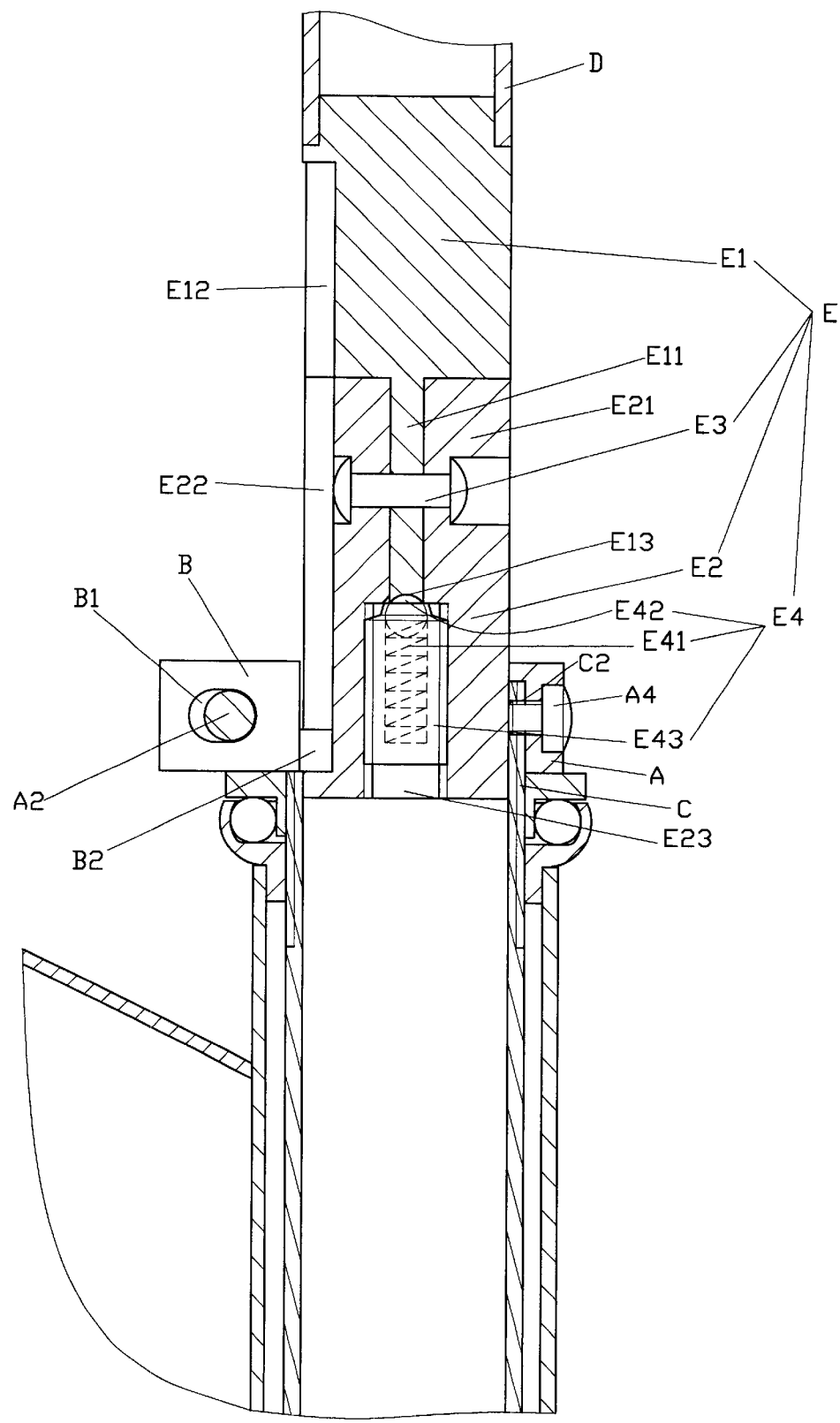
FIG. 12 is a schematic view showing the prior art with its handle being folded up.
Figure 13:
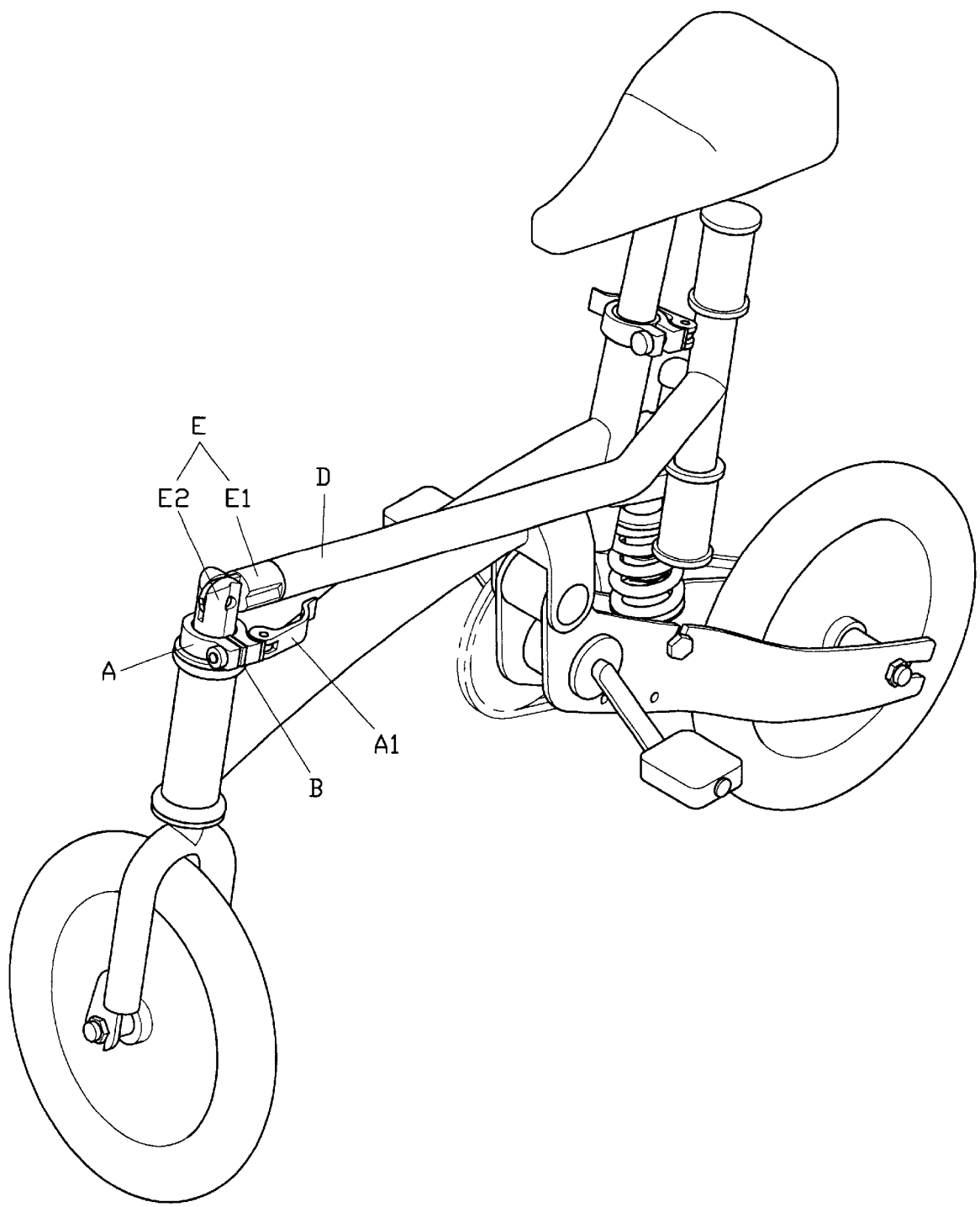
FIG. 13 is a perspective view of the prior art with its handle folded up.

The preferred embodiment described above is related to the application of the present invention in a foldable bicycle. However, the present invention is also applicable to other types of cycling means with a handle to drive the front wheel, such as a scooter, or a tricycle for children. As illustrated in FIGS. 8 and 9, the present invention is applied in a scooter with handle.

A handle folding structure of a foldable bicycle disclosed above by having the folding structure to connect the head tube below the handle and the fork pivoting tube that penetrate through the stem to be made possible for release to pull out the head tube for free rotation to facilitate the storage of the handle and the head tube, and both of the fork and the front wheel are able to execute free rotation to reduce the protrusion size of the front wheel when stored, thus to minimize the size of the entire frame for storage.

I claim:

1. A folding structure for a handle of a foldable bicycle comprising a joint connected to a lower end of a head tube of a lower part of said handle; a clamp inserted to an upper part of a fork pivoting tube pivoted through a stem; a positioning bit having a conic stop inside to extend into said fork pivoting tube; an upper section of said joint being pivoted to a lower section of said joint; said joint being inserted into said fork pivoting tube; one longitudinal chute being provided each respectively on one side of said upper section and said lower section of said joint to allow said conic stop extending into said fork pivoting tube from said positioning bit to hold against said chutes characterized by that:

a circumferential groove of the same depth being formed at a lower end of said longitudinal chute on said lower section of said joint so to pull out with said joint at the lower end of said head tube to its extreme for said conic stop from the positioning bit to hold against the lower end of said longitudinal chute on said lower section of said joint; said joint being able to rotate freely by said circumferential groove at the end of said chute on said lower section in relation to said conic stop from said positioning bit; and both of said handle and a front wheel being able to execute free rotation.

* * * * *